United States Patent [19]
Winkler et al.

[11] 3,884,892
[45] May 20, 1975

[54] METHOD FOR THE PRODUCTION OF POLYVINYL ALCOHOL

[75] Inventors: Heinz Winkler; Eduard Bergmeister, both of Burghausen, Upper Bavaria; Siegfried Strebel, Raitenhaslach, all of Germany

[73] Assignee: Wacker-Chemie GmbH, Munich, Germany

[22] Filed: Jan. 28, 1974

[21] Appl. No.: 436,964

[30] Foreign Application Priority Data
Jan. 31, 1973 Germany............................ 2304684

[52] U.S. Cl............................ 260/91.3 PV; 260/85.7
[51] Int. Cl. .............................................. C08f 27/16
[58] Field of Search...................... 260/91.3 PV, 85.7

[56] References Cited
UNITED STATES PATENTS
3,072,624   1/1963   Akaboshi et al................... 260/91.3

Primary Examiner—Stanford M. Levin
Attorney, Agent, or Firm—Hammond & Littell

[57] ABSTRACT

An improved process for the production of polyvinyl alcohol by catalytic alcoholysis of its esters comprising charging an alcoholic polyvinyl ester solution of a relatively high viscosity into a confined space, disposing a layer of one or more alcohols having a lower specific gravity than said alcoholic ester solution on top of said alcoholic ester solution, disposing a layer of a liquid alcoholysis catalyst solution having a higher specific gravity than said one or more alcohols below said one or more alcohols layer, stirring said contents of said confined space whereby a suspension of alcoholic ester solution beads in said alcohols layer is formed, for a time sufficient to effect alcoholysis and recovering polyvinyl alcohol.

10 Claims, No Drawings

METHOD FOR THE PRODUCTION OF POLYVINYL ALCOHOL

THE PRIOR ART

Numerous methods for the production of polyvinyl alcohol are known from the state of the art. All are based on the complete or partial hydrolysis of polyvinyl esters. This applies both to continuous and to the discontinuous methods. Most methods start from a homogeneous alcoholic polyvinyl ester solution. The addition of the hydrolysis catalyst is effected in continuous processes continuously, the corresponding amount of the ester solution being mixed with the catalyst continuously to a homogeneous mixture before the reaction sets in, and the homogeneous mixture being brought from the mixing zone into the reaction zone.

In discontinuous processes too, a main feature is to distribute the catalyst as homogeneously as possible in the alcoholic ester solution. Here the well-known considerable viscosity increase, which can lead to gelling of the batch, necessarily appears at the start of the reaction. This viscosity increase naturally requires much more energy for kneading or stirring. This either limits the size of the batch, or a considerable power reserve must be available for this peak load. The alternative of making the addition of the catalyst at a regulated rate such that the viscosity increase with the above-described consequences remains within acceptable limits requires such a great extended reaction time that the space-time output, that is, the capacity of the plant, is diminished.

OBJECTS OF THE INVENTION

An object of the present invention is the development of an improved process for the production of polyvinyl alcohol by catalytic alcoholysis of its esters whereby all of the catalyst is present from the beginning, but the mixture is not homogeneous and the power requirements for stirring are not as severe.

Another object of the invention is the development of a process for the production of polyvinyl alcohol by catalytic alcoholysis of its ester comprising the steps of charging into a confined space from 50 to 80% of the total volume of reactants of a solution having a relatively high viscosity and a specific gravity of over 0.9 measured at 20°C of 1. a polyvinyl ester selected from the group consisting of a polyvinyl lower alkanoate, copolymers of mixtures of vinyl lower alkanoates and copolymers of a vinyl lower alkanoate with up to 20% by weight of other ethylenically unsaturated monomers copolymerizable with vinyl lower alkanoates, in 2. an alkanol having from 1 to 4 carbon atoms, disposing an alcoholic layer of from 15 to 49.5% by total volume of reactants of one or more alkanols having from 1 to 4 carbon atoms, the specific gravity of the alcoholic layer being below 0.84. measured at 20°C above said polyvinyl ester solution, disposing a layer of from 0.5 to 8% by total volume of reactants of a liquid alcoholysis catalyst solution of (a) from 0.1 to 5% by weight, based on the weight of said polyvinyl ester, of an alcoholysis catalyst selected from the group consisting of alkali metal hydroxides, alkali metal lower alkanolates and strong mineral acids, in (b) a solvent selected from the group consisting of alkanols having 1 to 4 carbon atoms and mixtures of alkanols having 1 to 4 carbon atoms with water, said catalyst solution having a specific gravity of at least 0.1 higher than the specific gravity of said alcoholic layer, below said alcoholic layer, stirring said reactants whereby a suspension of said polyvinyl ester solution in droplet form in said alcoholic layer is formed, for a time sufficient to effect alcoholysis, and recovering polyvinyl alcohol.

These and other objects of the invention will become more apparent as the description thereof proceeds.

DESCRIPTION OF THE INVENTION

A method for the production of polyvinyl alcohol by catalytic alcoholysis of its esters has now been found which is characterized in that the alcoholic polyvinyl ester solution is overlaid with one or more alcohols of a lower specific gravity and that this alcohol layer is underlaid with a liquid alcoholysis catalyst of higher specific gravity, then the entire batch is mixed by stirring to a suspension, and the polyvinyl alcohol is then isolated in known manner from the reaction mixture after the desired degree of hydrolysis has been obtained.

More particularly, the invention comprises an improved process for the production of polyvinyl alcohol by catalytic alcoholysis of its esters comprising charging an alcoholic polyvinyl ester solution of a relatively high viscosity into a confined space, disposing a layer of one or more alcohols having a lower specific gravity than said alcoholic ester solution on top of said alcoholic ester solution, disposing a layer of a liquid alcoholysis catalyst solution having a higher specific gravity than said one or more alcohols below said one or more alcohols layer, stirring said contents of said confined space whereby a suspension of alcoholic ester solution beads in said alcohols layers is formed, for a time sufficient to effect alcoholysis and recovering polyvinyl alcohol.

It was surprisingly found that no homogeneous solution is obtained with the method according to the invention even with vigorous stirring, but a suspension of spherical polyvinyl ester solution drops in alcohol results from the process. The alcoholysis reaction which has such a great effect on the viscosity of the suspension, takes place in this drop. The reaction mixture thus remains easily stirrable during the entire hydrolysis and no reinforced stirring elements are required.

Another advantage of the method is that the liquid catalyst can be introduced rapidly and that its homogeneous distribution in the alcohol is effected in a short time. The catalyst can thus penetrate evenly into the polyvinyl ester solution droplets in all directions, and the alcoholysis takes place rapidly and evenly. All these advantages mean that a considerable increase of the space-time-output of an existing plant can be achieved, for example, without any investment outlay.

The reason for the formation of a suspension instead of the expected homogeneous solution can perhaps be seen in the fact that the polyester solution particles or drops formed primarily by stirring are saponified from the contact with the catalyst on the outer surfaces and thus receive a saponified film, and that this insoluble film prevents the homogeneous dissolution of the polyvinyl ester droplets in the alcohol.

The method according to the invention is generally carried out as follows:

An alcoholic polyvinyl ester solution is charged into a vessel. Then the alcohol is poured over the polyvinyl solution. Due to its lower specific gravity and the high viscosity of the polyvinyl ester solution the overlaying can be effected without any difficulty. Then the liquid catalyst solution is added. The latter has a higher specific gravity, and thus drops through the alcohol layer. The high viscosity of the polyvinyl ester solution prevents, however, mixing with the lower layer, so that the liquid catalyst solution spreads between the alcohol layer and the polyvinyl ester layer. This also occurs when the liquid catalyst solution has a higher specific gravity than the polyvinyl ester solution. Subsequently, a suspension of polyvinyl ester solution particles in alcohol is produced by stirring.

In some cases it is also possible to apply the liquid catalyst solution on the polyvinyl ester solution and to pour the alcohol over it.

The polyvinyl ester employed is the polyvinyl esters of a lower alkanoic acid having 1 to 7 carbon atoms, such as polyvinyl acetate or polyvinyl formate, for example. However, copolymers of mixtures of vinyl lower alkanoates or copolymers of vinyl lower alkanoates with other ethylenically unsaturated monomers copolymerizable with vinyl lower alkanoates in amounts up to about 20% by weight, such as crotonic acid, acrylic acid, acrylamide, N-methylolacrylamide and ethylene can also be used. The alcohol employed in the solutions of the polyvinyl esters are mostly alkanols having 1 to 4 carbon atoms such as methanol or ethanol solutions, with a content of from 25 to 75% by weight, preferably from 30 to 65% by weight of the polyvinyl ester. However, isopropyl alcohol and butyl alcohol, as well as mixtures of the said alcohols (alkanols with 1 to 4 carbon atoms) can also be used. The specific gravity of the solution is preferably over 0.9 as measured at 20°C and in the range of 0.9 to 1.1, particularly 0.95 to 1.05, at 20°C.

The alcohol used for the overlaying of the polyvinyl ester solution is mostly the same alcohols which are used for the dissolution of polyvinyl acetate. But other alcohols or alcohol mixtures of alkanols having 1 to 4 carbon atoms can also be used. The specific gravity of the alcohols or of the alcohol mixtures is preferably below 0.84 as measured at 20°C and in the range of 0.785 to 0.83 at 20°C. In most cases methanol is employed.

The catalyst employed in the liquid catalyst solution can be of an alkaline or acid nature. Examples of alkaline catalysts are alcoholic solutions of alkali metal hydroxides such as sodium or potassium hydroxide or alkali metal lower alkanolates, such as lithium, sodium or potassium lower alkanolates, where the alcohols, preferably the same alkanols having 1 to 4 carbon atoms as in the other layers, if necessary together with water, are used as solvents. In most cases methanolic sodium hydroxide and/or sodium methylate in methanol is used as a liquid catalyst solution. As acid catalysts, the strong mineral acids are employed, for example, sulfuric acid and phosphoric acid, preferably in an aqueous alkanolic solution as above. The catalytic substances are used in amounts of from 0.7% to 5% by weight preferably from 0.2% to 3% by weight, based on the polyvinyl esters. The specific gravity of the liquid catalyst is generally in the range of 0.885 to 1.1, preferably 0.90 to 1.05 at 20°C.

A density difference between the alcohol layer and the liquid catalyst solution is necessary to ensure a rapid drop of the catalyst through the alcohol layer. In general the difference should be at least 0.1. It is not essential however, that a density difference between the liquid catalyst and the polyvinyl ester solution be maintained since the liquid catalyst solution does not penetrate into the polyvinyl ester solution, due to the high viscosity of the polyvinyl ester solution.

The quantitative portions of the individual layers are generally in the following ranges: 50% to 80 by volume of the total amount is the polyvinyl ester solution, the alcohol portion is 15 to 49.5% by volume, and that of the liquid catalyst solution is 0.5 to 8% by volume.

The adjustment of the desired degree of hydrolysis of the polyvinyl ester is effected, as is known, by means of the amount and type of catalyst or by stopping the alcoholysis by adding an inhibitor or by adding catalyst-hindering esters, such as methyl acetate, and water, with which the reaction velocity can be influenced. In general, degrees of hydrolysis between 70 and 100 mol % are desired.

The reaction is generally carried out at room temperature, but temperatures in the range of between 10°C and 50°C can also be used. The reaction time depends to a great extent on the amount of catalyst used. Mostly the reaction is conducted over periods of between a half hour and 5 hours.

The working up of the suspension after the alcoholysis reaction can likewise be effected in known manner, for example, by filtering, washing and drying, by drying by distillation (with and without vacuum) under stirring, or by expelling the excess alcohol and the ester formed during the reaction by steam distillation to obtain immediately a processable aqueous solution on condensation of the aqueous vapor. The polyvinyl alcohol obtained corresponds in its substantial criteria to the presently produced polyvinyl alcohols. It differs from them merely by the more equal distribution of the hydrolysis.

The method according to the invention can also be carried out continuously, in which case, in contrast to the known methods, a more or less good and/or homogeneous suspension, depending on the method, is obtained, rather than the prior art case of obtaining a homogeneous gel cake.

The following examples are illustrative of the invention without being limitative in any respect.

EXAMPLE 1

In a stirring apparatus, the following ingredients are mixed under stirring:

4000 kg of a polyvinyl acetate solution (65% by weight polyvinyl acetate — where the polyvinyl acetate had a molecular weight of about 50,000 — and 35% by weight methyl alcohol, density of the solution 1.020), with 1000 kg of methyl alcohol (density 0.79) and
2500 kg of aqueous sodium hydroxide (soda lye) in methyl alcohol (density 0.81, 1.2% sodium hydroxide).

The power consumption was at first 12 ampere, after 5 minutes 48 ampere were attained, and finally the stirrer stopped. A solid gel was obtained.

EXAMPLE 2

In the same stirring apparatus as in Example 1
4000 kg of the polyvinyl acetate solution, as before, were overlaid with
2200 kg of methyl alcohol and then the alcohol was underlaid, by carefully pouring into the alcohol layer, with 200 kg of a methanolic NaOH (density 1.05, 20% sodium hydroxide).

Subsequently the layers were mixed by stirring. A suspension was obtained.

The power consumption increased from 12 ampere after about 10 minutes to 17 ampere, and dropped after a short time (10 minutes) again to the initial value. After stirring for about 2 hours, the catalyst residue was neutralized by the addition of about 1 liter of glacial acetic acid. The resulting polyvinyl alcohol was freed of alcohols and alcoholysis by-products by the injection of steam and was dissolved in the condensed water vapor. A polyvinyl alcohol was obtained with a viscosity of 2.94 cP (4% solution at 20°C) and a degree of hydrolysis of 98.5%.

EXAMPLE 3

4000 kg of the polyvinyl acetate solution of Example 1 were overlaid in a stirrer apparatus with 1000 kg of methyl alcohol, and the alcohol was underlaid with 85 kg of a methanolic soda lye (density 1.03, 18% sodium hydroxide).

Subsequently the layers were mixed by stirring to give a suspension. There was no substantial increase of the power consumption. A polyvinyl alcohol was obtained with a viscosity of 2.8 cP (4% solution at 20°C) and a degree of hydrolysis of 87%.

EXAMPLE 4

2500 kg of a polyvinyl acetate solution (60% by weight polyvinyl acetate — where the polyvinyl acetate had a molecular weight of 100,000 + 40% methyl alcohol, density of the solution 1.0) were overlaid in a stirrer apparatus with 650 kg of methyl alcohol and the alcohol was underlaid with 45 kg of methanolic soda lye (density 0.93, 10% sodium hydroxide).

Subsequently the layers were mixed by stirring to give a suspension. The power consumption of the stirrer was initially 20 ampere, and rose then slightly to 21 ampere. The suspension was subsequently transferred to a second vessel, and the polyvinyl alcohol was obtained there by distilling off the volatile components. The adjusted degree of hydrolysis was stabilized by the addition of glacial acetic acid during the distillation. A polyvinyl alcohol was obtained with a viscosity of 4.15 cP (4% solution at 20°C) and a degree of hydrolysis of 72%.

EXAMPLE 5

3000 kg of a polyvinyl acetate solution (45% by weight of polyvinyl acetate — where the polyvinyl acetate had a molecular weight of ab. 200,000 + 55% methyl alcohol, density of the solution 0.98) were overlaid with 1200 kg of methyl alcohol, and the alchol was underlaid with 30 kg of a methanolic soda lye (density 0.97, 10% sodium hydroxide, 18% water).

Subsequently the layers were mixed by stirring to give a suspension, and then transferred after the hydrolysis to another vessel. A polyvinyl alcohol was obtained with a viscosity of 12.9 cP and a degree of hydrolysis of 98%.

The preceding specific embodiments are illustrative of the practice of the invention. It is to be understood, however, that other expedients known to those skilled in the art or disclosed herein may be employed without departing from the spirit of the invention or the scope of the appended claims.

We claim:

1. A process for the production of polyvinyl alcohol by catalytic alcoholysis of its esters comprising the steps of charging into a confined space an alcoholic polyvinyl ester solution of a relatively high viscosity and a specific gravity of over 0.9 measured at 20°C, disposing a layer of one or more alcohols having a specific gravity of below 0.84 on top of said alcoholic ester solution, disposing a layer of a liquid alcoholysis catalyst solution in an alcohol having a specific gravity of at leat 0.1 higher than the specific gravity of said alcohols layer below said alcohols layer, where the alcohols employed are alkanols having 1 to 4 carbon atoms, stirring said reactants whereby a suspension of said polyvinyl ester solution in droplet form in said alcoholic layer is formed, for a time sufficient to effect alcoholysis, and recovering polyvinyl alcohol.

2. The process of claim 1 wherein said polyvinyl ester solution has a specific gravity of from 0.9 to 1.1, said layer of one or more alcohols has a specific gravity of from 0.785 to 0.83 and said liquid alcoholysis catalyst solution has a specific gravity of from 0.885 to 1.1, all measured at 20°C.

3. The process of claim 1 wherein said polyvinyl ester solution has a specific gravity of from 0.95 to 1.05, said layer of one or more alcohols has a specific gravity of from 0.785 to 0.83 and said liquid alcoholysis catalyst solution has a specific gravity of from 0.90 to 1.05, all measured at 20°C.

4. The process of claim 1 wherein said polyvinyl ester is polyvinyl acetate.

5. The process of claim 1 wherein said alkanols having 1 to 4 carbon atoms are methanol.

6. The process of claim 1 wherein said alcoholysis catalyst is methanolic soda lye.

7. The process of claim 1 wherein said alcoholysis catalyst is sodium methylate in methanol.

8. A process for the production of polyvinyl alcohol by catalytic alcoholysis of its esters comprising the steps of charging into a confined space from 50 to 80% of the total volume of reactants of a solution having a relatively high viscosity and a specific gravity of over 0.9 measured at 20°C of (1) a polyvinyl ester selected from the group consisting of a polyvinyl lower alkanoate, copolymers of mixtures of vinyl lower alkanoates and copolymers of a vinyl lower alkanoate with up to 20% by weight of other ethylenically unsaturated monomers copolymerizable with vinyl lower alkanoates, said polyvinyl lower alkanoate, said vinyl lower alkanoates and said vinyl lower alkanoate each represent a vinyl ester of a lower alkanoic acid having 1 to 7 carbon atoms, in (2) an alkanol having from 1 to 4 carbon atoms, disposing an alcoholic layer of from 15% to 49.5% by total volume of reactants of one or more alkanols having from 1 to 4 carbon atoms, the specific gravity of the alcoholic layer being below 0.84 measured at 20°C above said polyvinyl ester solution, disposing a layer of from 0.5% to 8% by total volume of reactants of a liquid alcoholysis catalyst solution of (a) from 0.1% to 5% by weight, based on the weight of said polyvinyl ester, of an alcoholysis catalyst selected from the group consisting of alkali metal hydroxides, alkali metal lower alkanolates and strong mineral acids, in (b) a solvent selected from the group consisting of alkanols having 1 to 4 carbon atoms and mixtures of alkanols having 1 to 4 carbon atoms with water, said catalyst solution having a specific gravity of at least 0.1 higher than the specific gravity of said alcoholic layer, below said alcoholic layer, stirring said reactants whereby a suspension of said polyvinyl ester solution in droplet form in said alcoholic layer is formed, for a time sufficient to effect alcoholysis, and recovering polyvinyl alcohol.

9. The process of claim 8 wherein said polyvinyl ester solution has a specific gravity of from 0.9 to 1.1, said layer of one or more alcohols has a specific gravity of from 0.785 to 0.83 and said liquid alcoholysis catalyst solution has a specific gravity of from 0.885 to 1.1, all measured at 20°C.

10. The process of claim 8 wherein said polyvinyl ester solution has a specific gravity of from 0.95 to 1.05, said layer of one or more alcohols has a specific gravity of from 0.785 to 0.83 and said liquid alcoholysis catalyst solution has a specific gravity of from 0.90 to 1.05, all measured at 20°C.

* * * * *